July 25, 1967 P. M. ANDERSON 3,333,069

PUSHBUTTON STOP FOR MULTIPLE KEY TELEPHONE SET

Filed Jan. 15, 1964

Inventor
Philip M. Anderson
By Mann, Brown & McWilliams
Attys.

United States Patent Office 3,333,069

Patented July 25, 1967

3,333,069
PUSHBUTTON STOP FOR MULTIPLE KEY TELEPHONE SET

Philip M. Anderson, 12501 Justine St., Chicago, Ill. 60643

Filed Jan. 15, 1964, Ser. No. 337,800
5 Claims. (Cl. 200—42)

This invention relates to a pushbutton for use in facilitating the disabling of a normally mobile pushbutton key, and more particularly is concerned with a simplified leaf-shaped abutment stop that may be inserted in existing equipment with but a minimum of disassembly operations, thus markedly reducing expensive maintenance time required for installing and removing such stops.

Currently there is in wide use in the Bell Telephone System a multiple key telephone set designated as a "Call Director." These "Call Director" telephone sets have one or more multiple selector key banks or assemblies, each of which typically includes six pushbuttons providing five-line capacity and one "hold" button. These buttons are mechanically interlocked so that depressing any one button mechanically releases any previously depressed button. In the construction that is employed, the individual pushbutton keys are normally mobile, even if the corresponding line is not being used.

In those circumstances, where there are one or more unused lines, there exists the problem that accidental actuation of a nonfunctional key may interrupt service on the active lines because of the mechanical interlock release action that is built into the standardized key bank. It is therefore required practice to disable any of the non-functional keys providing a mechanical stop for the pushbutton corresponding to the unused line. At present, the mechanical stop may be installed or removed only by substantially completely disassembling the telephone set.

The principal object of this invention is to provide a mechanical pushbutton stop that may be installed with ease on a multiple key telephone set.

Other and further objects of the present invention will be apparent from the following description and claims, and are illustrated in the accompanying drawings which show structure embodying preferred features of the present invention and the principles thereof, and what is now considered to be the best mode in which to apply these principles.

Figures 1, 2, 5:
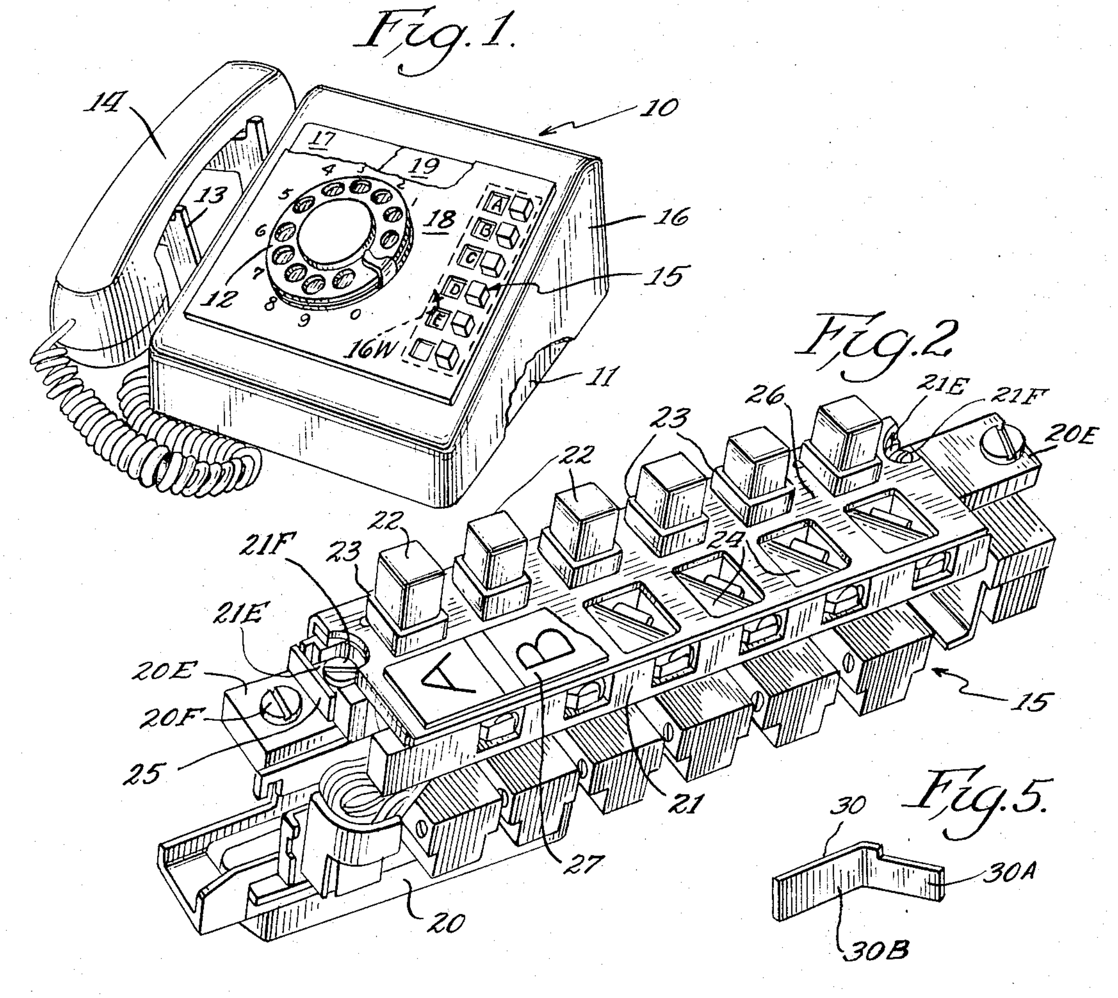
FIG. 1 is a perspective view of a conventional telephone set of the type that commonly employs a pushbutton stop.
FIG. 2 is an enlarged perspective view of a multiple selector key assembly that is utilized in the telephone set of FIG. 1.
FIG. 5 is a perspective view of the stop that is employed in accordance with this invention.

Referring now to the drawings, the conventional telephone set of the type referred to by the trade name "Call Director" is depicted in FIG. 1 and is designated generally at 10. The set includes a base 11 having provision for mounting of the dial 12 and having a cradle 13 for the usual ear and mouthpiece unit 14. The base 11 also affords a mounting location for the multiple selector key assembly 15, and all of this equipment is enclosed by means of a cover housing 16 which is mechanically secured to the base by suitable screws (not shown). The housing 16 is provided with a window area 16W bordering and framing the selector key assembly 15. Finally, an assembly comprised of metal and plastic face plate elements 17 and 18, respectively, having an indicia mat 19 sandwiched therebetween is applied to the upper face of the housing 16. This face plate and mat assembly is releasably applied in overlying snap mounted relation on the cover housing 16.

Figure 3:
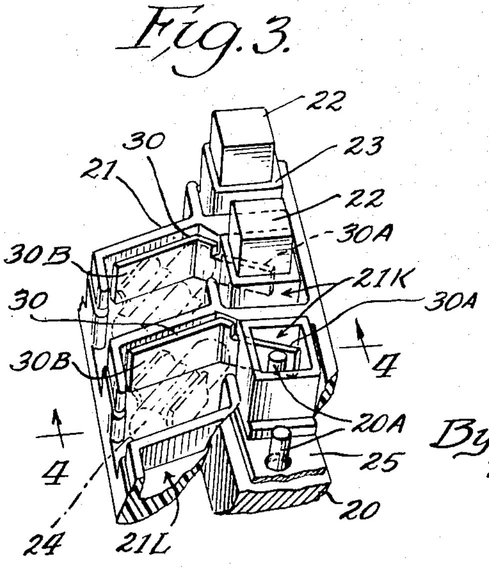
FIG. 3 is a fragmentary perspective view of face regions of the selector key assembly illustrating the stop in installed position.
Figure 4:
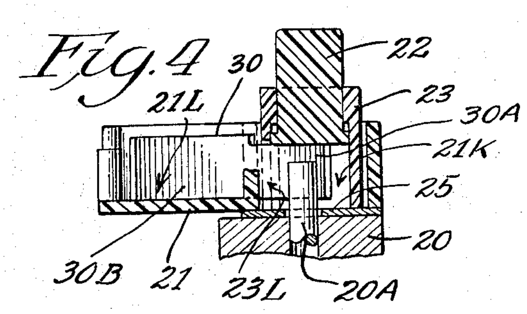
FIG. 4 is a detailed sectional view taken on the line 4—4 of FIG. 3.

Certain details of the selector key assembly 15 are apparent from the view in FIG. 2 and are important to an understanding of the time-saving features of the present invention. The selector key assembly 15 includes a wired multiple-line, multiple-switch equipped mounting frame 20 having edge regions 20E thereof equipped with mounting fasteners 20F for operative connection in removably mounted relation to the base. Each switch in the bank is provided with an upstanding actuator 20A as shown in FIGS. 3 and 4.

The selector key assembly 15 includes, on top of the mounting frame 20, a multiple cavity open-face mounting block 21 overlying the mounting frame and having edge regions 21E equipped with mounting fasteners 21F that are releasably engageable in the mounting frame 20. Each cavity in this block 21 includes a key pocket 21K open at the bottom to receive the corresponding actuator 20A and a lamp pocket 21L in laterally open communication with the key pocket 21K.

The selector key assembly 15 is also equipped with a translucent pushbutton key assembly mounted in each key pocket and each comprised of a button element 22 and a stationary sleeve element 23 mechanically retained in the pocket to encircle the actuator 20A that projects thereinto and having a lateral wall opening 23L facing towards the lamp pocket 21L at the region of communication between the corresponding key and lamp pockets. The button element 22 is slidable downwardly through the sleeve element 23 to engage and depress the actuator 20A and to be restored to elevated position upon release of the actuator. A bulb 24 is shown in each lamp pocket 21L and it is arranged to be energized when the corresponding button is depressed for illuminating the depressed button. The illumination enters partially through the wall opening 23L in the sleeve elementl and partially through the lateral wall of the sleeve element which is translucent.

The selector key assembly 15 also includes a retainer shield 25 that is removably mounted across the underface of the mounting block 21 to span the key pockets and encircle the actuators 20A and finally there is provided a snap mounted light shield frame 26 (see FIG. 2) overlying the mounting block 21 to be fully exposed through the window of the cover housing 16. A paper designation strip 27 is adhered in overlying masking relation across the lamp pocket region of the light shield frame, and bears indicia representative of the lines controlled by each pushbutton assembly.

In the past, in order to mechanically disable the key corresponding to an unused line of the multiple line selector key assembly 15, it has been necessary substantially to completely disassemble the telephone set. In particular, the past practice has been to insert a cylindrical tube (not shown) into the key pocket to encircle the upper end of the actuator and to bear against the retainer shield 25 for preventing depression of the button. To remove or insert such a stop access to the key pocket must be made through its open underneath face and this involves the following disassembly steps:

(a) Remove the snap-mounted face plate and mat assembly 17, 18 and 19;

(b) Remove the cover housing 16 from the base 11 by disengaging anchoring screws (not shown) at the rear of the cover housing;

(c) Access may now be had to edge regions of the multiple selector key assembly 15 to remove the screw fasteners 20F that anchor the mounting frame 20 to the base to permit removal of the selector key assembly;

(d) Remove the screw fasteners 21F that hold the mounting block 21 to the mounting frame 20 to permit separating these parts;

(e) Remove the metal retainer shield 25 from the underface of the mounting block;

(f) Insert the cylindrical tube (not shown) through the underside of the mounting block 21 into the particular key pocket 21K corresponding to the key which is to be made immobile; and (g) Repeat the above steps in reverse to re-assemble the equipment.

In accordance with the present invention a unique stop element 30 is provided for disabling a non-functional key with a minimum of disassembly of the telephone set and in a minimum of time. The stop element 30 as shown in FIG. 5 is in the form of an elongated rigid-walled leaf element preferably of an electrically insulating material and having an angular configuration in side elevation. In the use of this stop 30 it is necessary to remove the face plate and mat assembly 17, 18 and 19 while maintaining the cover housing 16 in its mounted position on the base. This gives direct access to the light shield frame 26 which is now fully exposed through the window 16W of the cover housing and which is releasable because it is only snap mounted onto the multiple cavity mounting block.

Upon removal of the light shield frame 26 the abutment leaf 30 may be inserted by directing it obliquely downwardly and endwise into the lamp pocket 21L associated with the non-functional key to nest the leaf in this lamp pocket with one end 30A of the leaf projecting in clearance relation through the lateral wall opening 23L of the corresponding sleeve element 23 to underlie a portion of the button element 22 and prevent actuator engaging movement of the such button element.

The angular configuration of the abutment leaf 30 permits its projecting end 30A to extend substantially centrally within the sleeve element 23 to locate alongside the actuator and be in position for certain engagement with the button element 22, in the event that someone attempts to depress it. In its mounted location, the abutment leaf has its opposite end 30B which is located in the lamp pocket 21L extending therethrough in adjacency to the pocket wall to act as a wall liner and thus stabilize the mounted position of the leaf element.

The end 30A of the abutment leaf which projects through the sleeve element is preferably reduced in width to facilitate its insertion while the end 30B of the leaf which is in the lamp pocket extends almost the full height thereof to improve the stability. In the preferred form, the leaf 30 is thinner than the lateral wall opening 23L, and its width dimension is less than the height dimension of the wall opening 23L to facilitate insertion of the leaf.

The re-assembly operations merely involve replacing the light shield frame 26 and thereafter replacing the face plate and mat assembly 17, 18, and 19.

Thus, while preferred constructional features of the invention are embodied in the structure illustrated herein, it is to be understood that changes and variations may be made by those skilled in the art without departing from the spirit and scope of the appending claims.

What is claimed is:

1. A method for disabling a normally mobile non-functional key of a multiple key conventional telephone set wherein each key has mechanical interlocking release action on each other key, said conventional set having a base, a multiple selector key assembly including a wired multiple line-multiple switch equipped mounting frame having edge regions equipped with mounting fasteners operatively connected in removably mounted relation to said base and having an upstanding actuator for each said switch, a multiple cavity open faced mounting block overlying said frame and having edge regions equipped with mounting fasteners that are releasably engageable with said frame, each said cavity having a key pocket encircling a corresponding actuator and a lamp pocket in laterally open communication, a translucent key assembly for each key pocket and having a stationary sleeve element encirculaing the corresponding actuator and having a lateral wall opening facing the lamp pocket and a button element slideable downwardly through said sleeve element to depress said corresponding actuator and to be restored upon release of such actuator, a cover housing removably mounted on said base and having internal marginal face portions overlying and masking said fasteners and defining a window that frames the cavities of said block, and a faceplate and mat assembly releasably applied in overlying relation upon said cover housing and spanning spaced regions of said cavities; and said method comprising unmasking said lamp pockets by removing said faceplate and mat assembly while maintaining said cover housing in position on said base, inserting an abutment leaf into the lamp pocket associated with the non-functional key to nest the leaf in the last-named pocket with one end of such leaf projecting through said lateral wall opening of said corresponding sleeve element to underlie a portion of said corresponding button element and thereby prevent actuator engaging movement of such button element, and repositioning said faceplate and mat assembly.

2. A method for disabling a normally mobile non-functional key of a multiple key conventional telephone set wherein each key has mechanical interlocking release action on each other key, said conventional set having a base, a multiple selector key assembly including a wired multiple line-multiple switch equipped mounting frame having edge regions equipped with mounting fasteners operatively connected in removably mounted relation to said base and having an upstanding actuator for each said switch, a multiple cavity open faced mounting block overlying said frame and having edge regions equipped with mounting fasteners that are releaseably engageable with said frame, each said cavity having a key pocket encircling a corresponding actuator and a lamp pocket in laterally open communication, a translucent key assembly for each key pocket and having a stationary sleeve element encircling the corresponding actuator and having a lateral wall opening facing the lamp pocket and a button element slideable downwardly through said sleeve element to depress said corresponding actuator and to be restored upon release of such actuator, a cover housing removably mounted on said base and having internal marginal face portions overlying and masking said fasteners and defining a window that frames the cavities of said block, a light shield frame overlying said mounting block cavities and fully exposed through said window and having a designation strip mounted in overlying masking relation across a lamp pocket region of the light shield frame, and a faceplate and mat assembly releasably applied in overlying relation uopn said cover housing and spanning spaced regions of said light shield frame; said method comprising unmasking said lamp pockets by removing first said faceplate and mat assembly and then said light shield frame while maintaining said cover housing in position on said base, inserting an abutment leaf into the lamp pocket associated with the non-functional key to nest leaf in the last-named pocket with one end of such leaf projecting through said lateral wall opening of said corresponding sleeve element to underlie a portion of said corresponding button element and thereby prevent actuator engaging movement of such button element, and repositioning first said light shield frame and then said faceplate and mat assembly.

3. A mechanical stop for disabling a normally mobile non-functional key of a multiple key conventional telephone set wherein each key has mechanical interlocking release action on each other key, said conventional set having a base, a multiple selector key assembly including a wired multiple line-multiple switch equipped mounting frame having edge regions equipped with mounting fasteners operatively connected in removably mounted relation to said base and having an upstanding actuator for each said switch, a multiple cavity open faced mounting block overlying said frame and having edge regions equipped with mounting fasteners that are releasably engageable with said frame, each said cavity having a key pocket encircling a corresponding actuator and a lamp pocket in laterally open communication, a translucent key assembly for each key pocket and having a stationary sleeve element encircling the corresponding actuator and having a lateral wall opening facing the lamp pocket and a button element slideable downwardly through said sleeve element to depress said corresponding actuator and to be restored upon release of such actuator, a retainer shield removably mounted across the underface of said mounting block to span said key pockets and encircle said actuators, a cover housing removably mounted on said base and having internal marginal face portions that overlie and mask said fasteners and define a window that frames the cavities of said block, a light shield frame overlying said mounting block cavities and fully exposed through said window and having a designation strip mounted in overlying masking relation across a lamp pocket region of said light shield frame, and a faceplate and mat assembly releasably applied in overlying relation upon said cover housing and spanning spaced regions of said light shield frame; said stop comprising an elongated rigid walled leaf element disposable in a cavity to render immobile the key assembly associated therewith and having one end insertable endwise through the corresponding sleeve element wall opening to underlie a portion of the corresponding pushbutton element, and having its opposite end extending as a wall liner in said lamp pocket and stabilizing the mounting relationsip of said leaf element in such cavity.

4. A stop in accordance with claim 3 and wherein said leaf element is of an electrical insulation material and is angular in side elevation to project its said one end substantially centrally within said sleeve element.

5. A stop in accordance with claim 3 wherein said set may include a retainer shield removably mounted across the underface of said mounting block to span said key pockets and encircle each said actuators.

References Cited

UNITED STATES PATENTS

| | | | |
|---|---|---|---|
| 2,048,848 | 7/1936 | De Tar | 200—42 |
| 2,673,259 | 3/1954 | Appleton et al. | 200—44 |

ROBERT K. SCHAEFER, *Primary Examiner.*

H. HOHAUSER, *Assistant Examiner.*